(12) United States Patent
Kim

(10) Patent No.: US 8,093,536 B2
(45) Date of Patent: Jan. 10, 2012

(54) DRYING APPARATUS AND METHOD FOR CONTROLLING THE SAME

(75) Inventor: Sang Doo Kim, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 1125 days.

(21) Appl. No.: 11/862,961

(22) Filed: Sep. 27, 2007

(65) Prior Publication Data

US 2008/0098615 A1   May 1, 2008

(30) Foreign Application Priority Data

Sep. 29, 2006  (KR) .................. 10-2006-0095303

(51) Int. Cl.
*H05B 1/02* (2006.01)
(52) U.S. Cl. .......... 219/497; 219/494; 219/507; 34/491; 34/553
(58) Field of Classification Search .................. 219/492, 219/494, 497, 501, 506–511; 34/528, 562, 34/486, 491, 550, 557
See application file for complete search history.

(56) References Cited

U.S. PATENT DOCUMENTS

| 4,887,767 | A | * | 12/1989 | Thompson et al. .......... 236/1 EB |
| 4,916,291 | A | * | 4/1990 | Jan .................. 219/492 |
| 5,291,667 | A | * | 3/1994 | Joslin et al. .................. 34/526 |
| 5,488,218 | A | * | 1/1996 | Olsen et al. .................. 219/492 |
| 5,852,881 | A | * | 12/1998 | Kuroda et al. .................. 34/527 |
| 6,851,948 | B2 | * | 2/2005 | Dempsey et al. .................. 431/18 |
| 7,127,832 | B2 | * | 10/2006 | Park et al. .................. 34/562 |
| 2005/0132599 | A1 | * | 6/2005 | Lee et al. .................. 34/549 |
| 2006/0086000 | A1 | * | 4/2006 | Lee .................. 34/524 |

* cited by examiner

*Primary Examiner* — Mark Paschall
(74) *Attorney, Agent, or Firm* — Birch, Stewart, Kolasch & Birch, LLP

(57) ABSTRACT

Provided is a drying system capable of determining if the number of on/off switching unitings of a heating mechanism exceeds a preset number over a preset duration, and reducing the amount of heat that the heating mechanism radiates, in order to extend the service life of the heating mechanism and a switching uniting mechanism

20 Claims, 6 Drawing Sheets

DRYING APPARATUS AND METHOD FOR CONTROLLING THE SAME

This application claims the benefit of Korean Application No. 10-2006-0095303, filed on Sep. 29, 2006, which is hereby incorporated by reference in its entirety.

BACKGROUND

The present disclosure relates to a drying system and a method of controlling the drying system.

A dryer is generally used to dry wet laundry.

A dryer supplies air heated by a heater into a drum. Here, the heater heats the air to be supplied to the drum to a temperature preset in a controller. The heater is turned on/off to maintain the temperature of the air fed into the drum within a preset temperature range. By thus controlling the heater, laundry can be dried without being burnt.

However, in related art dryers, lint collects in and blocks the dryer duct after a prolonged period of use. This can cause the thermostat mounted near the heater to malfunction by switching uniting on and off too frequently. When this causes the heater to excessively switching unit on/off, the service life of the heater is reduced. Also, if the heater does not operate properly and the ventilation of the heated air is not uniform, the duration of a drying cycle for laundry increases, thus consuming more energy.

SUMMARY

Embodiments provide a drying system and a controlling method of the drying system capable of extending the service life of the thermostat and heater.

Embodiments also provide a drying system and a controlling method of the drying system capable of reducing power consumption by shortening the duration of a drying cycle.

In one embodiment, a drying system includes: a heater heating air flowing into a drum; a switching unit turning the heater on/off to sustain a temperature inside the drum within a preset range; and a controller reducing a current supplied to the heater when it is determined that a number of on/offs of the switching unit exceeds a preset number over a preset duration.

In another embodiment, a drying system includes: a heating mechanism including a plurality of heaters heating air flowing into a drum; a switching unit turning at least one of the heaters on/off to maintain a temperature inside the drum within a preset range; and a controller reducing an amount of heat radiated by the heating mechanism when it is determined that a number of on/offs of the switching unit exceeds a preset number over a preset duration.

In a further embodiment, a method for controlling a drying system includes: switching a heater on/off to maintain a temperature inside a drum within a preset temperature range; and reducing a current supplied to the heater when it is determined that a number of on/offs of the heater exceeds a preset number over a preset duration.

In a still further embodiment, a method for controlling a drying system includes: switching at least one from a plurality of heaters of a heating mechanism on/off to maintain a temperature within a drum within a preset temperature range; and reducing an amount of heat radiated by the heating mechanism when it is determined that a number of on/offs of the at least one heater exceeds a preset number over a preset duration.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. The present disclosure may be applied to a condenser dryer, a vented dryer, or a washing machine with dryer capabilities. A condenser dryer dries laundry by circulating air in a closed circuit, and requires a condensing device to condense water from the moist, circulating air. Such condenser dryers spray water through moist air to remove moisture from the air. A vented dryer, on the other hand, exhausts moist air to the outside, and does not require a condensing device.

The description below will be based on a vented dryer.

Figure 1:
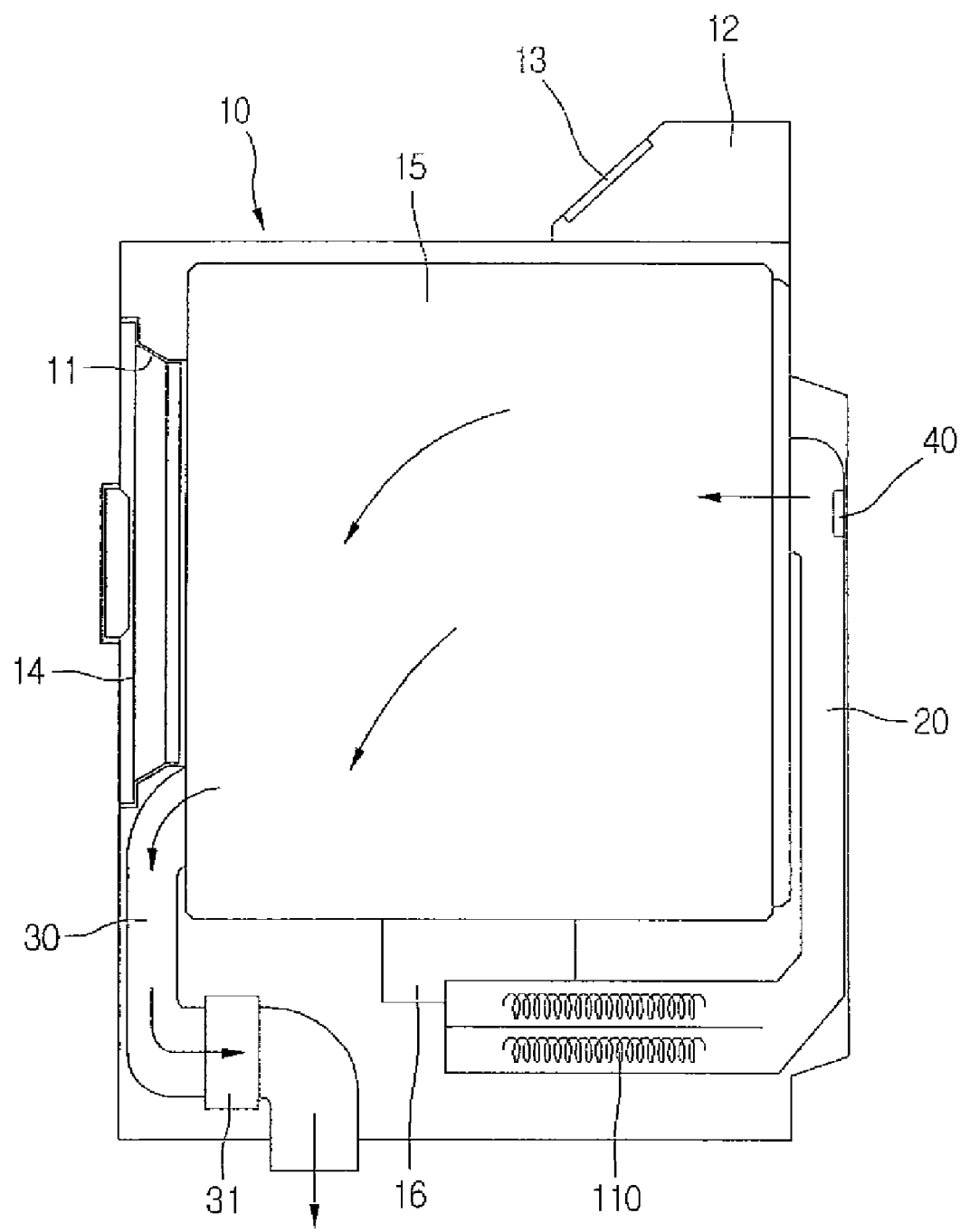
FIG. 1 is a schematic sectional view of a dryer according to the present disclosure.

FIG. 1 is a schematic sectional view of a dryer according to the present disclosure.

Referring to FIG. 1, the dryer has a control panel 12 located at the top of a cabinet 10. The control panel 12 includes various buttons (not shown), etc., with which a user can select predetermined functions.

The control panel 12 may include a notification unit through which various operating states of the dryer can be discerned. A display 13 may be used as the notification unit. The notification unit may include of an alarm emitter that issues notifications for certain operating states of the dryer and a light emitting diode (LED).

An opening 11 is formed at the front of the cabinet 10 to insert laundry through. A door 14 is disposed to open and close the opening 11 of the cabinet 10.

A drum 15 is rotatably provided within the cabinet 10. The drum 15 is rotated by a motor 16. Here, the drum 15 may be rotated by a motor through a belt or other driving link (not shown) in many different ways. On the other hand, the motor may be directly connected to the drum, so that the drum rotates in concert with the motor.

An air supply duct 20 is connected at the rear of the drum 15 to supply hot air into the drum 15. The air supply duct 20 may be connected from the rear of the cabinet 10 to the drum 15. The air supply duct may alternately be connected above or to the side of the drum 15.

A heater 110 may be disposed within the air supply duct 20. The heater 110 may be included in the drying system 100 (in FIG. 2). This drying system 100 will be described below.

An exhaust duct 30 is connected at the front of the drum 15. Of course, the exhaust duct may alternately be connected at a side or the rear of the drum. The exhaust duct 30 has a ventilator 31 disposed thereon. The ventilator 31 exhausts moist air from within the drum 15 to the outside. The ventilator 31 may be disposed within the air supply duct 20.

Also, a temperature sensing unit 40 is disposed outside the drum 15 to measure the temperature of the heated air. The temperature sensing unit 40 may be disposed in the air supply duct 20 or the exhaust duct 30.

Figure 2:
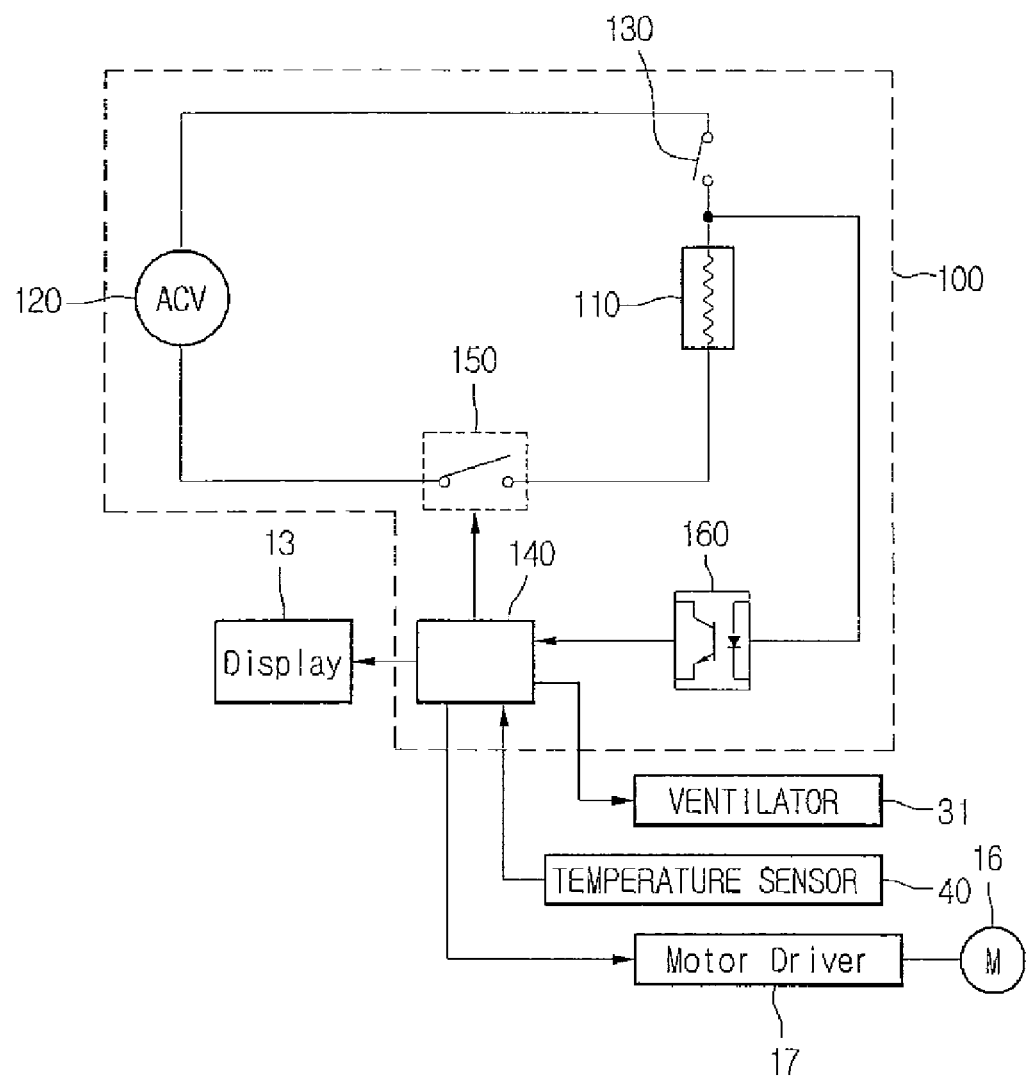
FIG. 2 is circuit diagram of an embodiment of a drying system including the dryer in FIG. 1.

FIG. 2 is circuit diagram of an embodiment of a drying system including the dryer in FIG. 1.

Referring to FIG. 2, a heater 110 for supplying hot air into a drum 15 may be included in a drying system 100. The heater 110 provided is a heating element that generates heat through electrical resistance. A power supply 120 for supplying power may be electrically connected to the heater 110.

A switching unit 130 for switching uniting the power supplied to the heater 110 on and off may be disposed between the power supply 120 and the heater 110. Here, a thermostat is disclosed as the switching unit 130. When the temperature sensed by a temperature sensing unit 40 is above a preset high temperature, the thermostat turns power to the heater 110 off, and supplies power to the heater 110 when the temperature is less than a preset low temperature. Thus, the air heated by the heater 110 is maintained in a range between the high and low preset temperatures, to maintain the inside of the drum within a predetermined drying temperature range.

A power modulator 150 is connected between the power supply 120 and the heater 110. Here, a triac that can adjust a current supplied by the power supply 120 and control the amount of heat radiated by the heater 110, through controlling of the controller 140, may be used as the power modulator 150. The triac cancels (eliminates) a portion of sinusoidal current frequencies, so that a current supplied to the heater 110 is lower than current supplied from the power supply 120. Thus, the power modulator 150 modulates the current supplied to the heater 110 to control the amount of heat radiated by the heater 110. Here, the triac cannot block the flow of current.

A sensing unit 160 for sensing whether the switching unit 130 is turned on or off is connected between the controller 140 and the heater 110. The sensing unit 160 may be a photo coupler. The photo coupler includes an infrared light emitting diode and a photo resist. The photo coupler prevents an induction current generated by the motor 16 from flowing through a ground wire, power line, signal wire, etc. to the controller 140 and making it malfunction. Thus, the photo coupler is able to electrically insulate the controller 140.

The controller 140 controls the ventilator 31, a motor driver 17, the control panel 12, and the display 13. In order to control the control panel 12 and the motor 16 separately, separate controllers may be installed for the control panel 12 and the motor 16.

Figure 3:
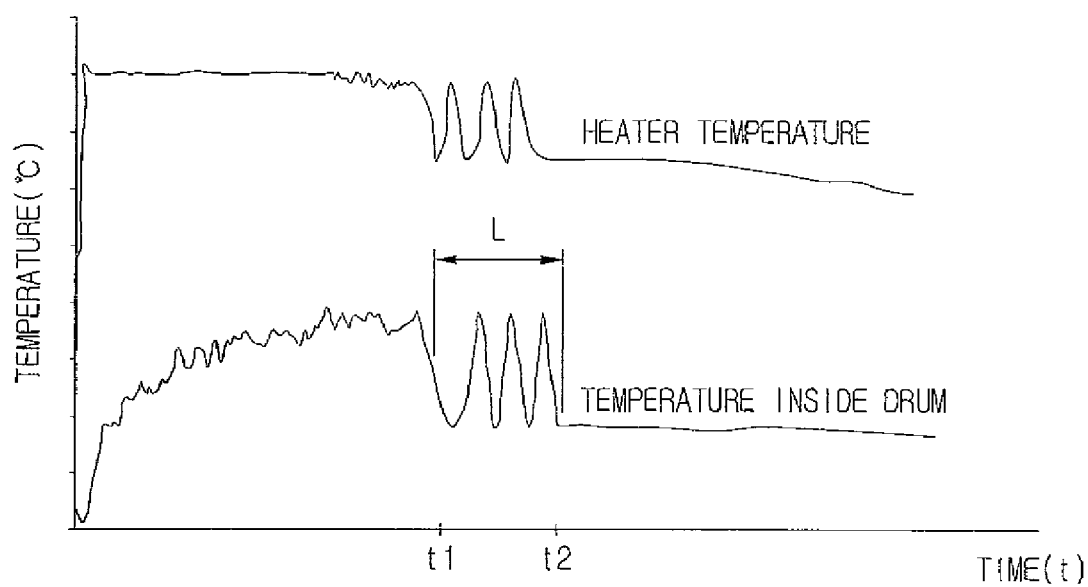
FIG. 3 is a graph showing controlled temperatures in a heater and a drum of the dryer in FIG. 1.

FIG. 3 is a graph showing controlled temperatures in a heater and a drum of the dryer in FIG. 1.

Referring to FIG. 3, when a current is supplied to the heater 110 through a connection of the switching unit 130, the sensing unit 160 relays a pulse signal to the controller 140.

Here, when the temperature within the drum 15 reaches a high temperature preset in the controller 140, the switching unit 130 turns power off. Here, the sensing unit 160 relays a high signal to the controller 140.

When the temperature within the drum 15 reaches a preset low temperature value, the switching unit 130 forms a connection to supply current to the heater 110. Here, the sensing unit 160 relays a pulse signal by means of the switching unit 130 connection to the controller 140. Also, the maximum amperage is supplied to the heater 110.

As described above, when the switching unit 130 is turned on and off, the sensing unit 160 relays a pulse signal and a high signal repeatedly to the controller 140. Accordingly, the controller 140 determines the number of on/off switching unitings of the heater 110 through the number of repeated pulse signals and high signals.

When the controller 140 determines that the heater 110 has been switching united on and off more than a preset number of times within a preset duration of t1-t2 (region L in FIG. 3), the controller 140 controls the power modulator 150 to supply a current to the heater 110 that is less than the amperage of the current supplied to the heater 110 at maximum output. That is, if the heater 110 is turned on and off too frequently over a certain duration, the power modulator 150 controls the opening (reducing) of sinusoidal current flow to reduce current supplied to the heater 110. Thus, the amount of heat radiated by the heater 110 is reduced. Here, the preset duration and the number of preset on/off switching unitings may be aptly set according to the dryer capacity, heater capacity, etc.

The controller 140 may continuously supply current to the heater 110 from the point at which a small amperage is supplied to the heater 110. Accordingly, even if the amperage that is less than a current required to achieve maximum output level of the heater 110 is supplied, laundry can be sufficiently dried. Thus, the heater 110 and the switching unit 21 do not have to be turned on/off while the heater 110 radiates heat, extending the service life of the heater 110 and the switching unit 21.

If it is determined by the controller 140 that the heater 110 has been switching united on/off more than a preset number of times over a duration L (in FIG. 3), data signifying that the exhaust duct 30 is clogged may be displayed by the display 13. Here, the controller 140 may issue an alarm through an alarm generator or supply current to an LED. Thus, a user is informed by the display 13, the alarm, and or the LED that lint collected in the exhaust duct should be emptied.

If it is determined by the controller 140 that the number of on/off switching unitings of the heater 110 is less than the preset number of times during the preset duration, the heater 110 is continuously operated at regular on/off switching uniting intervals to supply hot air within the drum 15.

A description of a controlling method for the above-configured system according to one embodiment will be provided.

Figure 4:
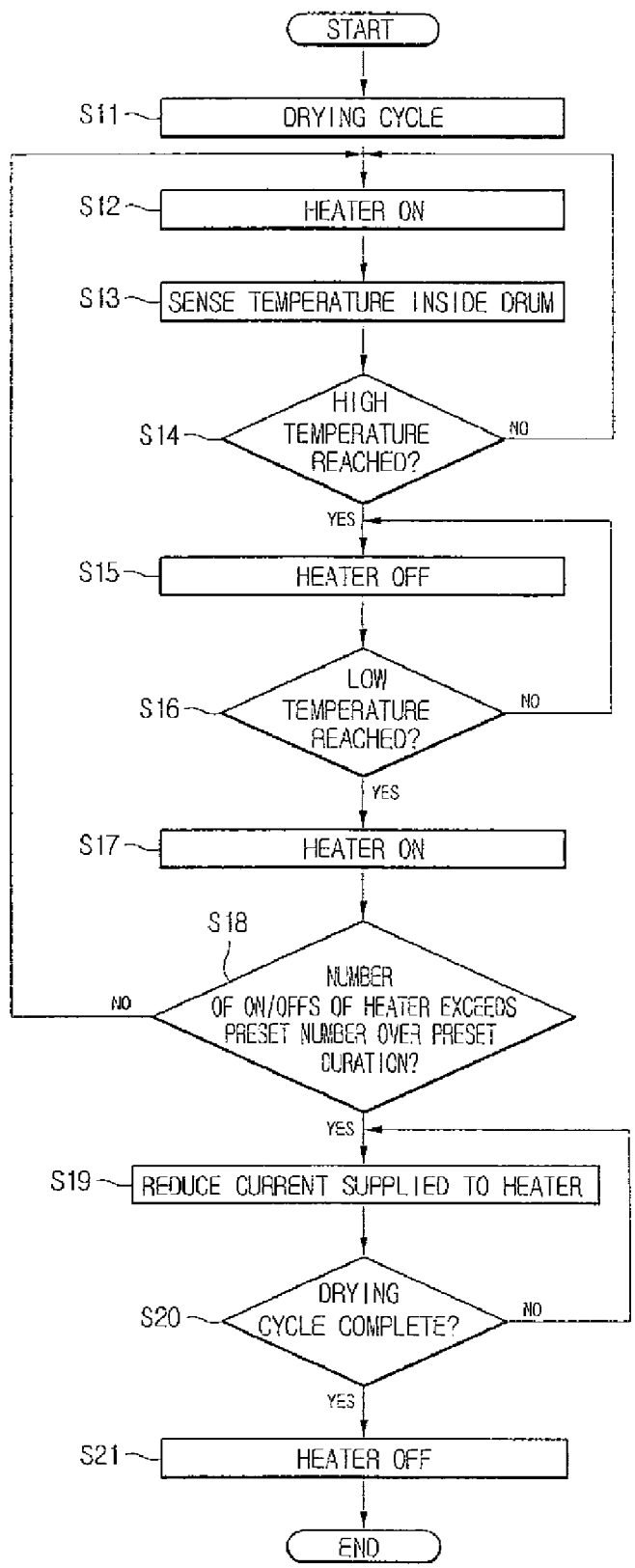
FIG. 4 is a flowchart of a method of a drying system according to one embodiment.

FIG. 4 is a flowchart of a method of a drying system according to one embodiment.

Referring to FIG. 4, when a drying cycle is begun in operation S11, the power supply 120 supplies power to the heater 110 in operation S12. Here, the switching unit 130 is in an ON state, and the heater 110 radiates heat due to electrical resistance. The sensing unit 160 relays a pulse signal to the controller 140.

The controller 140 controls the motor 16 that rotates the drum 15, and operates the ventilator 31 to blow heated air into the drum 15.

Here, the temperature sensing unit 40 senses the temperature within the drum 15 and relays data on the results to the controller 140 in operation S13.

The controller 140 determines in operation S14 whether the temperature within the drum 15 has reached a high temperature.

Here, if it is determined that the temperature within the drum 15 has not reached a preset high temperature, the switching unit 130 maintains power in the ON state. Here, the sensing unit 160 relays a pulse signal to the controller 140.

If it is determined that the inner temperature of the drum 15 has reached the preset high temperature, the switching unit 130 blocks the current being supplied to the heater 110 to turn the heater OFF in operation S15. Here, the sensing unit 160 relays a high signal to the controller 140.

When the heater 110 is turned OFF, because heated air is no longer supplied into the drum 15, the temperature within the drum 15 gradually drops.

The controller 140 determines in operation S16 whether the temperature within the drum 15 falls below a preset low temperature.

If it is determined that the temperature within the drum 15 has not fallen to a preset low temperature, the switching unit 130 maintains the power OFF state. Here, the sensing unit 160 relays a pulse signal to the controller 140.

If it is determined that the inner temperature of the drum 15 has reached a preset low temperature, the switching unit 130 turns power ON to supply current to the heater in operation S17.

When the heater 110 is repeatedly turned on and off as described above, the sensing unit 160 correspondingly relays pulse signals and high signals repetitively to the controller 140.

In operation S18, the controller 140 determines whether the number of on/off switching unitings of the heater 110 has exceeded a preset number within a preset duration. Here, the controller 140 counts the number of pulse signal and high signal repetitions to determine the number of on/off switching unitings of the heater 110.

When it is determined that the heater 110 was switching united on/off below the preset number of times in the preset duration, the heater 110 is turned on/off when the temperature in the drum 15 reaches the preset high and low temperatures.

When it is determined that the heater 110 was switching united on/off more than the preset number of times in the preset duration, the current supplied to the heater 110 is reduced by the controlling of the power modulator 150 in operation S19. Here, current may continuously be supplied to the heater 110 from the point t2 at which the amperage is reduced until the end of the drying cycle.

The controller 140 determines in operation S20 whether the drying cycle is completed. If it is determined that the drying cycle is completed, the controller 140 stops supplying current and turns the heater 110 OFF in operation S21.

The above embodiment has the following effects.

Because the number of on/off switching unitings of the heater and thermostat can be dramatically reduced, the service life of the heater and thermostat increases.

Also, by sustaining the heater in an ON state for a predetermined duration during the drying cycle, the drying time can be drastically reduced.

Additionally, because the drying cycle can be adequately performed with the heater being supplied with a lower amperage than a current at its maximum output, power consumed by the heater can be substantially reduced.

Further, by signaling that the exhaust duct is blocked with lint by means of the on/off timing of the heater, a user is informed of the precise time when lint must be removed from the exhaust duct.

Next, a description of a heating system according to another embodiment of the present disclosure will be given.

Figure 5:
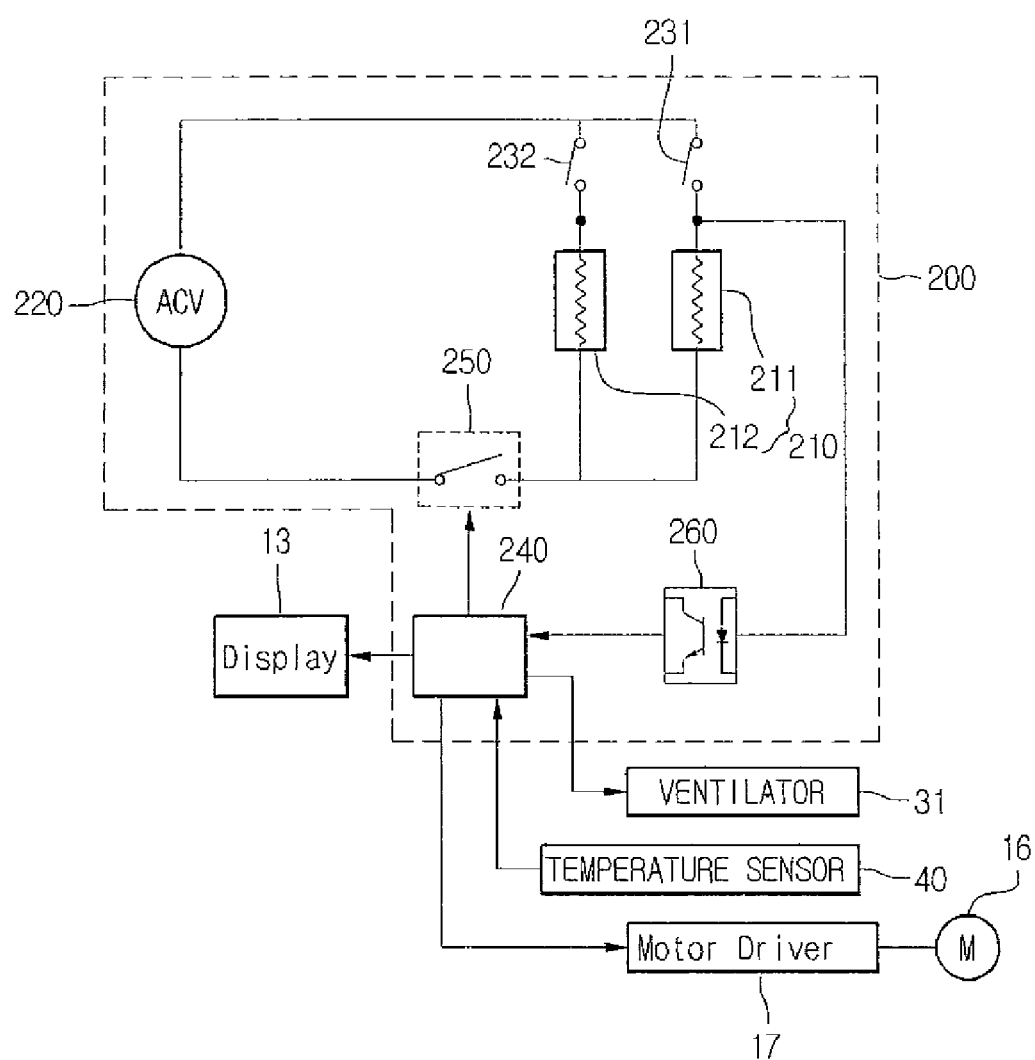
FIG. 5 is a circuit diagram of a drying system according to another embodiment.

FIG. 5 is a circuit diagram of a drying system according to another embodiment.

Referring to FIG. 5, the drying system 200 may include a heating mechanism 210 provided for supplying hot air into the drum 15 (in FIG. 1). The heating mechanism 210 includes a plurality of heaters 211 and 212 that radiate heat through electrical resistance. Here, the heaters 211 and 212 may have different capacities. Accordingly, during a drying cycle, both heaters 211 and 212 may be operated when maximum heat radiation is needed, and only one heater may be operated under less demanding circumstances.

The power supply 220 may be electrically connected to the heating mechanism 210 to supply power thereto.

A plurality of switching unites 231 and 232 may be disposed between the power supply 220 and each heater 211 and 212. Each switching unit 231 and 232 switching unites a corresponding heater 211 and 212 on/off to maintain the temperature inside the drum 15 within a range between a preset high and low temperature. Here, a thermostat may be provided as each switching unit 231 and 232.

A power modulator 250 is connected between the power supply 220 and the heating mechanism 210. Here, the power modulator 250 may be a triac that modulates current supplied from the power supply 220, by means of a controller 240. The triac reduces a sinusoidal current to supply the heater 210 with a lower amperage current than that supplied directly from the power supply 220.

Here, only a portion of the switching unites 231 and 232 may be turned ON when the low amperage current is supplied, to turn ON only a portion of the heaters. Therefore, the power modulator 250 and the switching unites 231 and 232 control the amount of heat radiated from the heating mechanism 210. Here, the triac cannot block the current.

A sensing unit 260 is connected between the controller 240 and the heating mechanism 210 to sense whether the switching unites are turned ON or OFF. The sensing unit 260 may be a photo coupler. The photo coupler may electrically insulate the controller 240.

The controller 240 controls a ventilator 31, a control panel 12, and a display 13. Also, controllers for respectively controlling the control panel 12 and motor 16 may be provided separately.

When both switching unites 231 and 232 are connected, current is supplied to both heaters 211 and 212 of the heating mechanism 210, and the sensing unit 260 sends a pulse signal to the controller 240.

Here, when the temperature inside the drum 15 reaches a high temperature preset in the controller 240, both switching unites 231 and 232 turn power off. Here, the sensing unit 260 relays a high signal to the controller 240.

When the temperature inside the drum 15 reaches a preset low temperature, both switching unites 231 and 232 are contacted and supply current to both heaters. Here, the sensing unit 260 relays a pulse signal to the controller 240 by means of the contacting of both switching unites 231 and 232. The heating mechanism 210 is supplied with current for its maximum output capacity.

Through the switching uniting on/off of both switching unites 231 and 232, the sensing unit 260 alternately relays pulse signals and high signals to the controller 240. Therefore, the number of repetitions of the pulse signal and high signal is used by the controller 240 to determine the number of on/off switching unitings of the heating mechanism 210.

When it is determined by the controller 240 that the number of on/off switching unitings of the heating mechanism 210 exceeds a preset number in a preset duration, the controller 240 controls the power modulator 250 to supply the heating mechanism 210 with a current lower than one required by the heating mechanism 210 at its maximum output. That is, when it is determined that the heating mechanism 210 is switching united on/off too frequently in a predetermined duration, the power modulator 250 reduces a portion of each frequency in a sinusoidal current to reduce the current supplied to the heating mechanism 210. Here, a portion of the heaters is made to generate heat by switching uniting on only a portion of the switching unites. Thus, the heat outputted by the heating mechanism 210 can be reduced.

Here, the preset duration and preset number of on/off switching unitings may be determined according to the dryer capacity, heater capacity, etc.

The controller 240 may supply power continuously to a portion of the heating mechanism from the point at which a smaller current is supplied to the heating mechanism 210. Accordingly, even when a smaller amperage than a current supplied for maximum output of the heating mechanism 210 is supplied, laundry can be sufficiently dried. Also, when a portion of the heaters and a portion of the switching unites are used, the remaining heaters and switching unites do not need to be turned OFF, thus increasing the service life of the heating mechanism and switching unites.

When it is determined by the controller 240 that all the heaters 211 and 212 and all the switching unites 231 and 232 are turned on/off for a number of repetitions exceeding a preset number over a preset duration, the display 13 (FIG. 1) may display a signal signifying that the exhaust duct 30 is clogged. Here, the controller 240 may issue an alarm through an alarm emitter or supply a current to an LED. In this way, lint may be removed from a clogged exhaust duct 30 by a user due to the display 13, alarm, and/or LED.

A controlling method according to another embodiment will be described.

Figure 6:
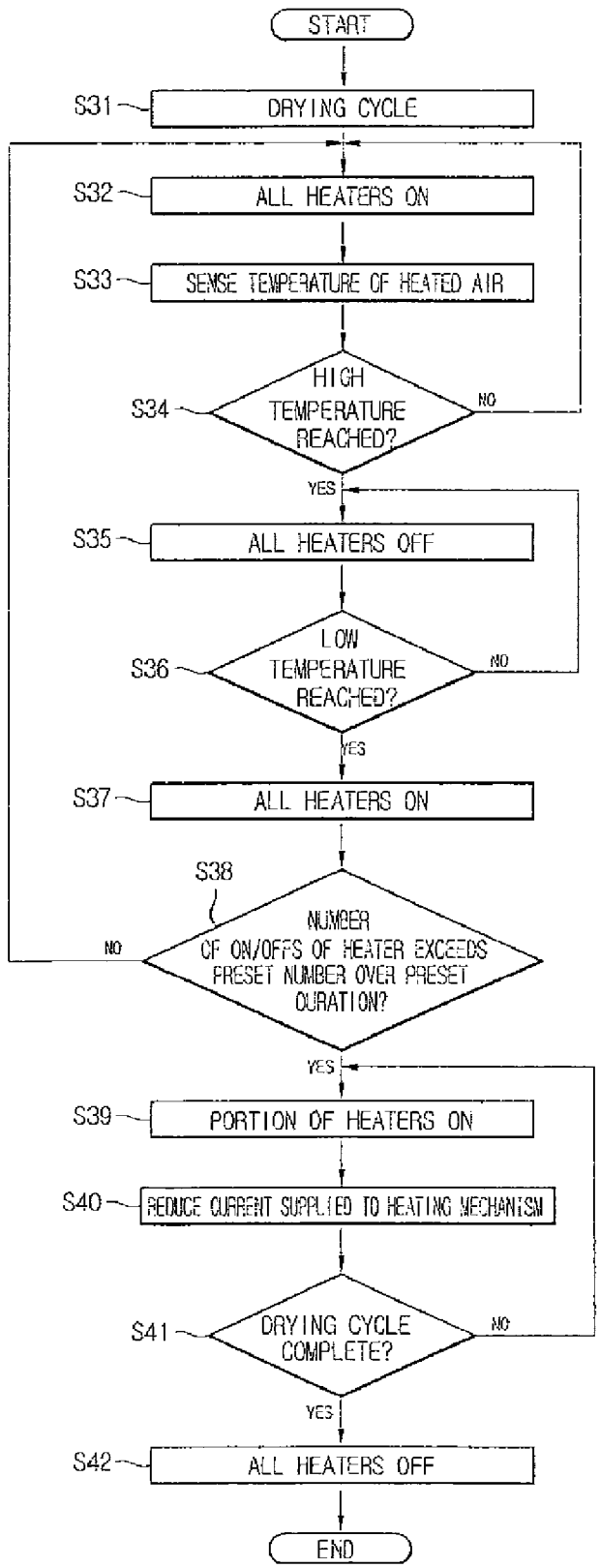
FIG. 6 is a flowchart of a method of a drying system according to another embodiment.

FIG. 6 is a flowchart of a method of a drying system according to another embodiment.

Referring to FIG. 6, when a drying cycle is begun in operation S31, the power supply 220 supplies power to all the heaters 211 and 212 of the heating mechanism 210 in operation S32. Here, all the switching unites 231 and 232 are turned ON, and the heaters 211 and 212 of the heating mechanism 210 radiate heat through electrical resistance. The sensing unit 260 relays a pulse signal to the controller 240.

The controller 240 controls the motor driver 17 to rotate the drum 15, and operates the ventilator 31 to supply heated air into the drum 15.

Here, the temperature sensing unit 40 (FIG. 1) senses the temperature within the drum 15, and relays the sensed data to the controller 240 in operation S33.

The controller 240 determines in operation S34 if the temperature inside the drum 15 has reached a high temperature.

Here, if it is determined that the temperature inside the drum 15 has not reached the preset high temperature, all the switching unites 231 and 232 are continuously switching united ON to operate all the heaters 211 and 212. Here, the sensing unit 260 relays a pulse signal to the controller 240.

When it is determined that the temperature within the drum 15 has reached the preset high temperature, the current supplied to all the heaters 211 and 212 may be blocked to turn all the heaters 211 and 212 OFF in operation S35. Here, the sensing unit 260 relays a high signal to the controller 240. Of course, current to only a portion of the heaters may be blocked, and the sensing unit 260 may relay a high signal to the controller 240.

When all the heaters 211 and 212 of the heating mechanism 210 are switching united OFF, because heated air is not supplied into the drum 15, the temperature inside the drum 15 gradually falls.

It is determined in operation S36 by the controller 240 whether the temperature inside the drum 15 has reached a preset low temperature.

If it is determined that the temperature inside the drum 15 has not reached the preset low temperature, the switching unites 231 and 232 continue to keep the power OFF. Here, the sensing unit 260 relays a pulse signal to the controller 240.

If it is determined that the temperature inside the drum 15 has reached the preset low temperature, the switching unites 231 and 232 are switching united ON, and all the heaters 211 and 212 of the heating mechanism 210 are supplied with current in operation S37.

The sensing unit 260 relays a pulse signal and a high signal alternatingly to the controller 240 according to the on/off switching unitings of the heaters 211 and 212 of the heating mechanism 210.

It is determined by the controller 240 in operation S18 whether the number of on/off switching unitings of all the heaters has exceeded a preset number over a preset duration. Here, the controller 240 counts the number of pulse signals and high signals to determine the number of on/off switching unitings of the heating mechanism 210.

If it is determined that the on/off switching unitings of all the heaters 211 and 212 of the heating mechanism 210 are below the preset number over the preset duration, all the heaters 211 and 212 of the heating mechanism 210 are repetitively switching united on/off depending on whether the inside temperature of the drum 15 reaches a preset high temperature and a preset low temperature.

If it is determined that the on/off switching unitings of all the heaters 211 and 212 of the heating mechanism 210 exceed a preset number over a preset duration, only a portion of the heaters is turned on by turning on a portion of the switching unites in operation S39. Also, the amount of current supplied to the heating mechanism 210 is reduced in operation S40 by the power modulator 250. Accordingly, the reduced current supplied to the heating mechanism 210 is supplied only to a portion of the heaters.

Here, the reduced current supplied to a portion of the heaters is continuously supplied from the point where the current is reduced to the end of the drying cycle, and the remaining heater remains OFF until the end of the drying cycle.

It is determined by the controller 240 in operation S41 whether the drying cycle is completed.

When it is determined that the drying cycle is completed, the controller 240 blocks the supply of current to turn all the heaters of the heating mechanism 210 OFF in operation S42.

The above method has the following effects.

When all the heaters and all the thermostats are turned on/off too frequently, a portion of the heaters and a portion of the thermostats are turned off, thereby extending the life of a portion of the heaters and thermostats.

Also, because a portion of the heaters operates continuously in an ON state for a predetermined duration to perform drying, compared to a method of turning all the heaters on/off repetitively to perform drying, drying time can be substantially reduced.

Additionally, because a current less than one supplied at the maximum output of the heating mechanism is sufficient to perform a drying cycle, power consumption by the heating mechanism can be reduced significantly.

Further, by displaying that the exhaust duct is clogged with lint through timing the on/off switching unitings of the heating mechanism, a user is informed exactly when to empty the exhaust duct of lint.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drying system comprising:
a drum;
a motor configured to rotate the drum;
a heater heating air flowing into the drum;
a ventilator configured to blow heated air into the drum;
a switching unit turning the heater on/off to sustain a temperature inside the drum within a preset range;
a controller configured to control the motor, to operate the ventilator, and to reduce a current supplied to the heater when it is determined that a number of on/offs of the switching unit exceeds a preset number over a preset duration; and
a sensing unit configured to sense a temperature within the drum, to relay pulse signals and high signals repetitively to the controller, and to sense and relay the number of on/offs of the switching unit to the controller.

2. The drying system according to claim 1, wherein the sensing unit is a photo coupler electrically insulating the controller.

3. The drying system according to claim 1, further comprising an indicator indicating when the number of on/offs of the switching unit exceeds the preset number over the preset duration.

4. The drying system according to claim 3, wherein the indicator is a display.

5. The drying system according to claim 1, further comprising a power modulator controlling an amount of heat radiated by the heater through reducing the current supplied to the heater.

6. The drying system according to claim 1, wherein the controller continuously supplies a reduced current to the heater from a point when the current supplied to the heater is reduced until a drying cycle is completed.

7. The drying system according to claim 1, wherein the heater is disposed within a duct that guides heated air into the drum.

8. A drying system comprising:
a drum;
a motor configured to rotate the drum;
a heating mechanism including a plurality of heaters heating air flowing into the drum;
a switching unit turning at least one of the heaters on/off to maintain a temperature inside the drum within a preset range;
a controller configured to control the motor, to operate the ventilator, and to reduce an amount of heat radiated by the heating mechanism when it is determined that a number of on/offs of the switching unit exceeds a preset number over a preset duration; and
a sensing unit configured to sense a temperature within the drum, to relay pulse signals and high signals repetitively to the controller, and to sense and relay the number of on/offs of the switching unit to the controller.

9. The drying system according to claim 8, wherein the controller turns a portion of the heaters ON to reduce the amount of heat radiated from the heating mechanism.

10. The drying system according to claim 9, wherein the portion of the heaters is continuously operated until a drying cycle is completed.

11. The drying system according to claim 8, further comprising an indicator indicating whether the number of on/offs of the switching unit exceeds the preset number over the preset duration.

12. The drying system according to claim 8, further comprising a power modulator controlling the amount of heat radiated by the heating mechanism through reducing a current supplied to the heating mechanism.

13. A method for controlling a drying system comprising:
radiating heat by a heater when a switching unit is in an ON state;
controlling a motor that rotates a drum and operating a ventilator to blow heated air into the drum;
sensing a temperature within the drum and relaying data to the controller using a temperature sensing unit;
switching uniting the heater on/off to maintain a temperature inside a drum within a preset temperature range;
relaying pulse signals and high signals repetitively to the controller using a sensing unit;
reducing a current supplied to the heater when the sensing unit senses that a number of on/offs of the heater exceeds a preset number over a preset duration; and
determining whether a drying cycle is complete and stopping supplying current and turning the heater OFF.

14. The method according to claim 13, wherein the current supplied to the heater is continuously supplied from a point at which the current is reduced to when the drying cycle is completed.

15. The method according to claim 13, further comprising indicating through an indicator that the number of on/offs of the heater exceeds the preset number over the preset duration.

16. The method according to claim 15, wherein at least one of an image, a character, and an alarm is indicated by the indicator.

17. A method for controlling a drying system, comprising:
radiating heat from a plurality of heaters of a heating mechanism when a switching unit associated with each heater of the plurality of heaters is turned ON;
controlling a motor that rotates a drum and operating a ventilator to blow heated air into the drum;
sensing a temperature within the drum and relaying data to the controller using a temperature sensing unit;
switching at least one heater from the plurality of heaters of the heating mechanism on/off to maintain a temperature within a drum within a preset temperature range;
relaying a pulse signal and a high signal repetitively to the controller using a sensing unit;
reducing an amount of heat radiated by the heating mechanism when the sensing unit senses that a number of on/offs of the at least one heater exceeds a preset number over a preset duration; and
determining whether a drying cycle is completed and blocking the supply of current to turn all heaters of the heating mechanism OFF.

18. The method according to claim 17, wherein the reducing of the amount of heat radiated by the heating mechanism is performed through turning ON only a portion of the heaters of the heating mechanism.

19. The method according to claim 18, wherein the portion of the heaters switching united ON is switching united OFF until the drying cycle is completed.

20. The method according to claim 17, further comprising indicating through an indicator that the number of on/offs of the heater exceeds the preset number over the preset duration.

* * * * *